United States Patent
Aubert et al.

(10) Patent No.: US 6,388,992 B2
(45) Date of Patent: *May 14, 2002

(54) FLOW CONTROL TECHNIQUE FOR TRAFFIC IN A HIGH SPEED PACKET SWITCHING NETWORK

(75) Inventors: Denis Aubert, Saint Paul de Vence; Anne Chabannet, Le Bar sur Loup; Jean-Jacques Legoll, Cagnes sur Mer; Edmond Plattier, Antibes; Michel Szczap, La Gaude; Rene Mariotti, Nice, all of (FR)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/748,593

(22) Filed: Dec. 22, 2000

Related U.S. Application Data

(63) Continuation of application No. 08/935,758, filed on Sep. 23, 1997, now Pat. No. 6,167,027.

(30) Foreign Application Priority Data

Sep. 9, 1997 (EP) .............................................. 97480060

(51) Int. Cl.[7] .............................................. G01R 31/08
(52) U.S. Cl. ........................................ 370/232; 370/236
(58) Field of Search ................................ 370/230, 232, 370/235, 236, 237, 389

(56) References Cited

U.S. PATENT DOCUMENTS

| 5,280,470 A | | 1/1994 | Buhrke et al. | 370/232 |
|---|---|---|---|---|
| 5,311,513 A | | 5/1994 | Ahmadi et al. | 370/230 |
| 5,313,454 A | * | 5/1994 | Bustini et al. | 370/231 |
| 5,359,593 A | | 10/1994 | Derby et al. | 370/234 |
| 5,367,523 A | * | 11/1994 | Chang et al. | 370/235 |
| 5,448,567 A | | 9/1995 | Dighe et al. | 370/233 |
| 5,541,852 A | | 7/1996 | Eyuboglu et al. | 709/232 |
| 5,596,576 A | | 1/1997 | Milito | 370/450 |
| 5,625,622 A | | 4/1997 | Johri | 370/232 |
| 5,790,521 A | * | 8/1998 | Lee et al. | 370/230 |
| 5,815,492 A | * | 9/1998 | Berthaud et al. | 370/234 |
| 6,118,791 A | * | 9/2000 | Fichou et al. | 370/468 |
| 6,167,027 A | * | 12/2000 | Aubert et al. | 370/230 |

OTHER PUBLICATIONS

Shaaban, Transport Flow Control, EECC694, May 11, 2000.
Rexford, Jennifer L., et al., A Fair Leaky–Bucket Traffic Shaper for ATM Networks, 1994 or later (not dated).

* cited by examiner

Primary Examiner—Min Jung
(74) Attorney, Agent, or Firm—Cesari and McKenna, LLP; A. Sidney Johnston

(57) ABSTRACT

A flow control mechanism for use in a high speed packet switching network where calls are multiplexed on network trunks with each connection using a reserved amount of the total bandwidth. Data terminal equipments access the network via access nodes. Each access node includes a Leaky Bucket component which maintains a refillable token pool. Each time an incoming packet is received by the leaky bucket component, the number of available tokens is compared to two predetermined threshold values. If the number of tokens is less than the low threshold, acknowledgments of received packets are stopped, inducing an interruption of packets transmitted by the emitting terminals. Interrupting packet transmission will lead to a regeneration of the number of tokens in the token pool. If the number of tokens reaches the high threshold, acknowledgments are again generated to restore packet transmissions. The first and second thresholds are greater than zero, reducing the chances that a packet will be marked as being discardable.

16 Claims, 2 Drawing Sheets

FLOW CONTROL TECHNIQUE FOR TRAFFIC IN A HIGH SPEED PACKET SWITCHING NETWORK

CROSS-REFERENCE TO RELATED APPLICATION

The present application is a continuation of U.S. patent application Ser. No. 08/935,758, which was filed on Sep. 23, 1997, by Aubert et al. for a "Flow Control Technique for X.25 Traffic in a High Speed Packet Switching Network", issued on Dec. 26, 2000, U.S. Pat. No. 6,167,027.

TECHNICAL FIELD

The present invention relates to high speed packet switching networks and more particularly to a mechanism for controlling X.25 traffic data flow at an access node of a high speed packet switching network.

BACKGROUND ART

Major users have many disparate networks such as SNA, DECnet, TCP/IP and X.25 data networks as well as logical networks of fax machines and one or more voice networks. For management reasons users want to have only one network for all traffic. The emergence of high speed/bandwidth networking technologies, such as ATM cell-based technology, now makes possible the integration of multiple types of traffic like speech, video and data over the same communication network. The communication circuits which may be shared in such network include transmission lines, program controlled processors, nodes or links, and data or packets buffers. In such network an access node should thus be designed for supporting the access through users' existing communications equipment such as X.25 devices as well as for accommodating new equipment, such as equipment supporting ATM.

The present invention relates to access nodes in high speed cell switching networks supporting the attachment of devices using different protocols and particularly X.25 devices. In such networks, access nodes perform a set of functions known collectively as bandwidth management and congestion control, the role of which is to manage the network's resources (bandwidth in particular) such that the overall resource utilization is maximized while continuing to satisfy user requests for performance guarantees, usually referred to as quality of service or QOS. Congestion control is based on bandwidth reservation at the network connection. For each connection requiring a specific quality of service according to the protocol used, a certain amount of bandwidth is reserved on the links traversed by the connection. The bandwidth reservation contract is enforced by specific techniques such as the well-known leaky bucket algorithm.

In classical packet switching networks, flow control algorithms are based on indowing and buffer depletion techniques. A windowing scheme consists of defining packet credits (often referred to as a window). A credit represents the number of packets that an origin device, also referred to as Data Terminal Equipment or DTE, can send across the network without receiving an acknowledgment either from the network or from the destination device. This credit mechanism prevents the origin DTE from sending data to the destination DTE when the network or the destination DTE cannot reliably expect to receive such data, e.g. when the network is congested. Under network congestion conditions, no acknowledgment will be received by the origin DTE, which will stop sending data as soon as packets already in its current window have been transmitted, i.e., when its credit has been decremented to zero.

Buffer depletion schemes rely on monitoring of access node buffers which are used for storing packets in anticipation of such routing or while awaiting availability of an output link. The principle is to define two thresholds, which correspond to percentages of the total amount of buffer space available, and two corresponding states: congested and not_congested. Buffer depletion techniques are often associated with windowing schemes.

More specifically, with regard to the X.25 protocol, the X.25 ITU-T recommendation specifies the windowing mechanism mentioned above as a flow control technique. This technique is currently implemented at LAP-B (Link Access Protocol-Balanced) level and at PLP (Link Access Protocol) level. The general principle of a common implementation relies on the existence of three windows which are defined in a X.25 virtual circuit. A first window (origin window) is associated with the interface between the origin X.25 DTE and the input access node of the network. A second window (destination window) is dedicated to the interface between the output access node of the network and the destination X.25 DTE. A third window (internal window) is associated with the internal part of the network, that is, all network elements on the path between the input and output access nodes. In operation, the destination DTE indicates it is congesting by not sending acknowledgments of received packets. When the output network access node does not receive expected acknowledgments, it sends packets only until its existing credit (destination window) is depleted. Similarly, when the input access node fails to receive the expected acknowledgments, it sends packets only until its own credit (internal window) is depleted and then stops transmitting packets into the network. Finally, an origin DTE which does not receive the expected acknowledgments sends packets only until its existing credit (origin window) is depleted. This windowing mechanism can be associated with buffer depletion techniques that allow detection of the existence network congestion. A common buffer depletion technique consists of computing the amount of buffer space used by LAP-B frames which have entered the network access node and which have not yet been handled, and then comparing this number to predefined low/high buffer utilization thresholds. The LAP-B acknowledgments are stopped when the utilization of buffers exceeds the high threshold, and re-started when buffer utilization falls below the low threshold; this scheme is intended to avoid network congestion.

The above-cited X.25 common flow control technique is quite satisfactory for classical packet switching networks. But when X.25 traffic is routed through high speed digital networks using bandwidth reservation, such ATM or Frame Relay backbones networks, the X.25 common flow control scheme is not efficient enough to avoid network congestion. Indeed, in such networks an access node can support a large number of X.25 data terminal equipments (e.g. 4096 DTEs). Consequently, the total buffer size that would be classically be required for avoiding congestion is the sum of the packet window sizes required for all the logical channels entering the node, which correspond to the attached DTEs. For example, for 4096 windows, each including 7 packets of 1048 bytes, an access node would need a buffer size of 4096*7*1048 bytes=30 megabytes). Thus, a significant number of buffers would be required for this common technique to be efficient, which would increase significantly the cost of the system since buffer memories, which use high-speed, high-performance technologies, are expensive.

Furthermore, the X.25 common flow control technique is a reactive mechanism which can initiate flow control operations (by terminating sending of acknowledgments) only after congestion is already detected. Moreover, using the common flow control scheme will penalize all X.25 users connected to a given access node even those who are not responsible of the congestion. Finally, in a high speed packet network which uses a leaky bucket mechanism to discard excess traffic in case of network congestion, the discarding of X.25 excess packets would eventually cause the attached X.25 data source device to resend discarded packets even if congestion conditions still existed. Such retransmission could actually aggravate the access node congestion state.

Accordingly, a new technique of flow control is required for X.25 traffic routed over a high speed digital network based on bandwidth reservation, in order to prevent the onset of network/node congestion rather than just reacting to existing congestion.

SUMMARY OF THE INVENTION

An object of the present invention is to provide a technique for effectively controlling the flow of traffic through a high speed digital network which implements bandwidth reservation techniques. A flow control technique implemented at an access node of such network makes use of a leaky bucket mechanism implemented in the node for enforcing a bandwidth reservation contract in order to initiate control of traffic flow before congestion occurs.

The technique comprises the steps of: receiving and storing an incoming packet; computing the number of tokens in a token pool; interrupting the transmission of received packet acknowledgments to the emitting source if the number of tokens falls below a predefined threshold, causing the emitting source to stop transmitting packets and allowing replenishment of the number of tokens the token pool; and restarting the transmission of received packet acknowledgments to the source if the number of tokens exceeds another defined threshold, such that the emitting source resumes transmission of packets.

This method causes the level of tokens in the token pool to be maintained in a range greater than zero to prevent network congestion.

The flow control technique implementing the present invention prevents network congestion by avoiding marking of packets as "red" or discardable as would ordinarily occur in common packet switched networks, Avoiding "red" marking avoids retransmissions of packets, which as noted earlier might actually result in an increase in congestion. Furthermore, as the present flow control technique is implemented at a network connection level, in case of congestion alert for a given connection, only those attached devices having virtual circuits established on that network connection, will be affected by operation of the flow control mechanism. Other devices attached to the access node will not be penalized, as happens in common packet switching networks.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE INVENTION

Figure 1:
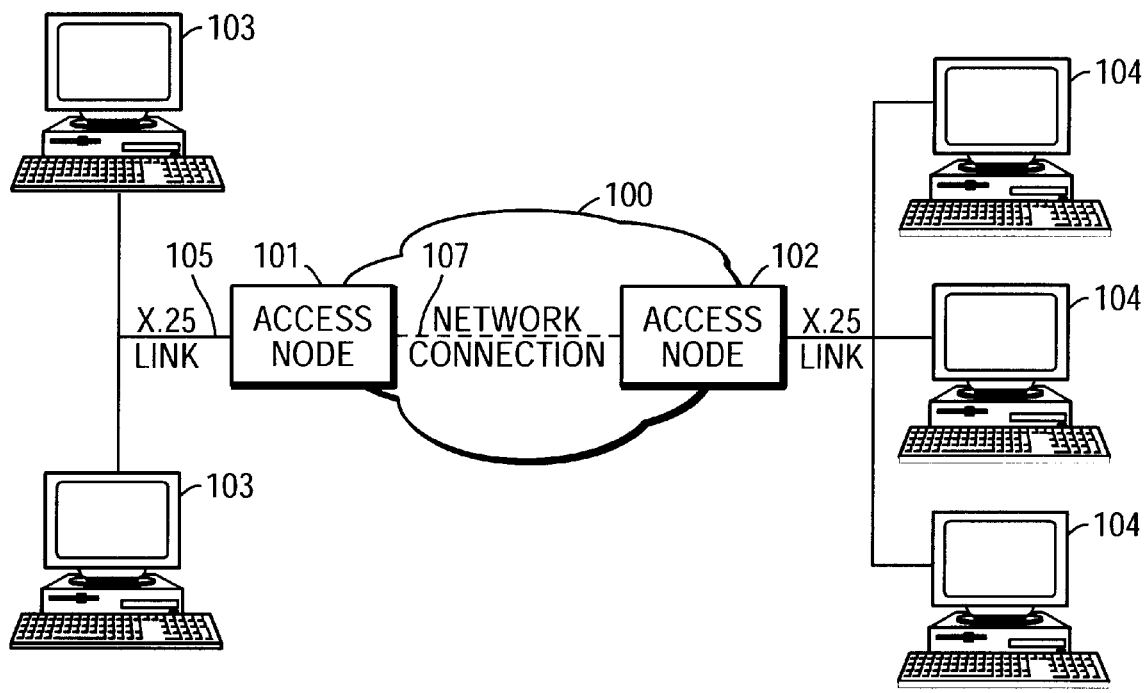
FIG. 1 illustrates a high speed packet switching network connecting X.25 data terminal equipments (DTEs)

Referring to FIG. 1 there is shown a high speed packet switching network 100 based on bandwidth reservation with two access nodes 101, 102 represented. X.25 DTEs 103 are connected to network access node 101 via X.25 link 105. DTEs 104 are connected to network access node 102 via X.25 link 106. A network bandwidth-reserved connection 107 enables communication between access nodes 101 and 102 by multiplexing corresponding X.25 virtual circuits.

Figure 2:
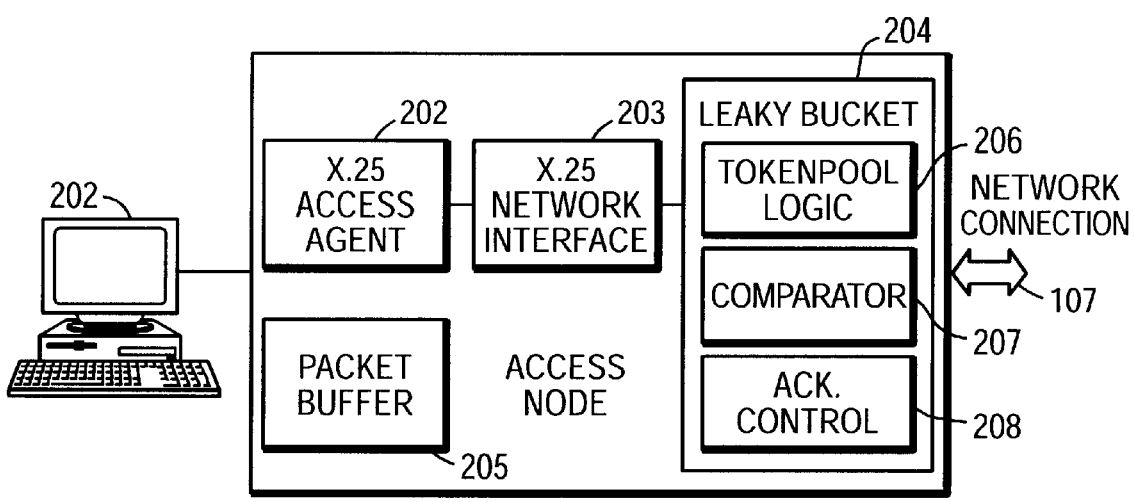
FIG. 2 shows the structure of a network access node receiving X.25 connections.

The functional structure of access node 101 is detailed in FIG. 2. The same structure applies to access node 102. Access node 101 comprises three primary functional elements which are implemented as software components: an X.25 Access Agent 202 connected to X.25 DTE 201, an X.25 Network Interface 203, and a Leaky Bucket congestion control element 204.

The X.25 Access Agent 202 is a X.25 protocol-specific element that presents the appearance of a X.25 standard interface DCE (Digital Communication Element) to the attaching device. More particularly, it performs the following functions it understands and interprets the external user service or protocol, that is, it communicates with the external equipment using its native X.25 protocol, performs address resolution to locate target user(s);

it uses network protocols to establish, maintain and take down X.25 connections across the backbone network to target users and ensures a grade of service that meets or exceeds the external requirements; and it guarantees bandwidth and ensures fairness among users.

The X.25 Network Interface 203 is responsible for setting up a network connection between two network access nodes (e.g. 101 and 102) in order to establish data transfer between attached X.25 DTEs. If a plurality of X.25 virtual circuits (VCs) have to be opened, these VCs are multiplexed over the same network connection. The bandwidth required for the network connection is determined by configuration and also depends on the number of VCs multiplexed.

The Leaky Bucket (LB) component 204 is a congestion control mechanism using the so-called leaky bucket algorithm. It is intended to provide assurance that an established connection does not exceed the bandwidth that has been allocated to it. In this way, it ensures that well-behaved users whose traffic profile remains within the traffic descriptors assigned do not suffer at the hands of misbehaving users. The working of the leaky bucket mechanism will be detailed below. The access node further includes logic elements which may be implemented as hardware, software or a combination of the two. Specifically, a packet buffer 205 is provided for temporarily storing received packets during the functioning of the leaky bucket mechanism. Token pool logic 206 is used to control the decrementing and replenishment of the token pool in the leaky bucket operation. A comparator circuit 207 is provided for comparing the number of tokens currently in the token pool against predetermined thresholds. Acknowledgement control logic 208 is provided to control the interruption and resumption of packet acknowledgements in accordance with the leaky bucket operation. The operation of these various logic elements will be understood once the operation of the leaky bucket mechanism is described in detail below.

After passing through the foregoing elements of the input access node, incoming X.25 frames are outputted as data packets to a network internal trunk which supports the network connection 107.

Bandwidth Reservation

Bandwidth is reserved for a network connection to guarantee that the packet loss ratio/cell loss ratio (PLR/CLR) in the network is below a specified maximum. The PLR/CLR expresses the likelihood that a packet will not reach its destination or not reach it by the time promised. The amount of bandwidth reserved is derived from knowledge of the user-specified traffic characteristics and the maximum PLR. In the network of the preferred embodiment, a user's traffic is characterized by the following three descriptors, in order to ensure a certain PLR/CLR. These descriptors are the peak rate (R), i.e., the maximum rate at which a user can submit data to the network; the mean rate (m) i.e., the average rate, measured over a relatively long period of time, at which a user submits data to the network; and the burst length (b) i.e., the average duration (in seconds) for which a user is allowed to submit data to the network at the peak rate. To minimize the amount of reserved bandwidth that needs to be reserved, the network reserves "just enough" bandwidth to meet QOS requirements. This is the notion of equivalent capacity. The equivalent capacity reservation enables statistical multiplexing of connections.

Congestion Control with Leaky Bucket Scheme

In such a fast-packet network, congestion control is performed at the network access points. This control consists of three basic functions: traffic monitoring, traffic policing, bandwidth adaptation.

The leaky bucket (LB) mechanism belongs to the traffic policing function which is a process of adjusting the incoming traffic to enforce conformance with the agreed-to mean and burst values; these actions will impair non-conforming connections. The leaky bucket algorithm performs two actions: tagging and discarding. Tagging consists in marking packets as excess when they arrive above the committed burst rate. Packets marked excess are also called red packets, while non-excess packets are called green. Discarding consists in discarding packets that arrive at a rate greater than the committed rate plus the extra rate being allowed as excess.

In accordance with a leaky bucket mechanism implemented in the preferred embodiment of the invention, when a X.25 virtual circuit is established between two network attached X.25 equipments from an origin access node to a destination access node, a network connection is established to transport X.25 data over the network, and four parameters required for the leaky bucket mechanism are computed. These parameters, which are functions of the connection peak rate (R), mean rate (m) and burst length (b), are defined as follows:

maximum amount of green tokens (MGT);
maximum amount of red tokens (MRT);
green token generation rate (Gr); and
red token generation rate (Rr).

These parameters are initialized at connection setup time. The tokens represent a potential packet transmission duration at a rate (Rt) which is derived from the connection reserved bandwidth (RBh). The green token pool is set to MGT and is continuously refreshed at the rate Gr, i.e. the pool is replenished at Gr bits per second but only to a value which does not exceed the MGT value. The red token pool is set to-the maximum value MRT and is continuously refreshed at the rate Rr, i.e. the pool is "refilled" at Rr bits per second up to the maximum value MRT. For each new incoming packet, the leaky bucket component (204) checks whether or not there is enough green tokens in the green token pool. If there are enough green tokens the packet is marked green and is immediately transmitted over the network. Conversely, if the amount of green tokens in the pool is too low, the leaky bucket mechanism checks whether the red token pool contains enough red tokens. If so, the packed is marked red i.e. discardable and as such it has a significant loss probability. Inversely, if the amount of red tokens in the red pool is too low, the packet is immediately discarded. After the incoming packet has been processed, a new value for green tokens is computed. Assuming that the last processed packet is the (n+1)th packet (where n is an integer) processed from the parameters initialization at connection setup, the current number of green tokens in the green pool GT(n+1) is defined by the following equation:

$$GT(n+1) = \text{minimum}[(GT(n) + Dn(n+1) - t(n+1)), MGT] \quad (1)$$

where:

GT(n) is the amount of green tokens computed after processing of the (n)th incoming packet;

Dn(n+1) is the time delay between the end of transmission of packet n and the beginning of transmission of packet n+1;

t(n+1) is the time duration for transmission of packet n+1; and

MGT is the maximum of green tokens set in the green token pool at initialization.

X.25 flow control scheme

As stated above according to the invention, there is provided a method to control flow and prevent network congestion during X.25 traffic routing. The method takes advantage of the leaky bucket mechanism implemented in the origin access node. The method is based on the use of two thresholds S1 and S2 which define two values of available green tokens in the green token pool. S1 and S2 are chosen such that:

$$0 < S1 < S2 < 1$$

In the preferred embodiment of the invention, S1 is set to 25 percent of the maximum amount of green tokens available for the connection (MGT) and S2 is set to 75 percent of MGT.

Figure 3:
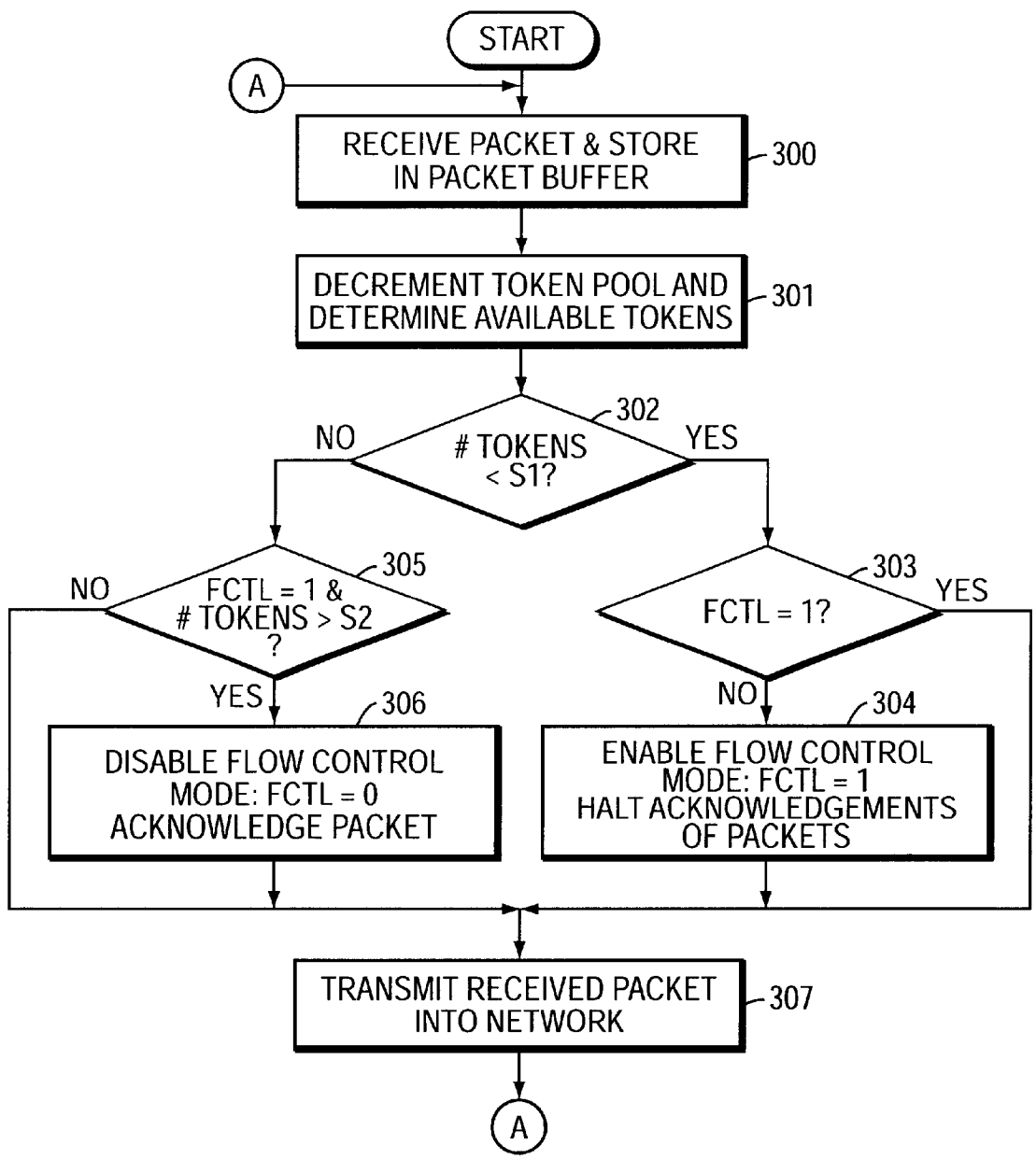
FIG. 3 is a flow chart showing the sequence of operations for implementing the X.25 flow control method according to the invention.

Referring to FIG. 3 there is shown a flow chart illustrating the sequence of operations required for implementing the X.25 flow control procedure according to the invention. In box 300, an X.25 incoming packet has been transmitted from the X.25 Access Agent (FIG. 2, 202) to the Leaky Bucket component (FIG. 2, 204) through the X.25 Network Interface (FIG. 2, 203). Next, in box 301 the current amount of available green tokens (NB_TOKEN) in the green token pool is computed, in accordance with equation (1). In decision box 302, the computed number of available green tokens, NB_TOKEN, is compared to first threshold S1 (e.g. 25% of MGT). If NB_TOKEN is less than S1, i.e. the green token pool contains less than S1 tokens, then in box 303 a flag FCTL is tested. Flag FCTL is indicative of the congestion state of the connection path. More precisely, the value of flag FCTL indicates whether the X.25 preventive flow control mode of the present invention has been enabled (FCTL=1) or disabled (FCTL=0). If FCTL=1, the connection path is congested and X.25 flow control mode is already enabled, i.e., received packets are not acknowledged by the X.25 Access Agent, so as to induce interruption of packets emission by the attached emitting X.25 device (as soon as its current transmission window is fully transmitted). Then, in box 307 the current incoming packet is transmitted over the network and a new cycle re-starts when a new incoming packet is received (300). Back to box 303, if FCTL=0, that is, the connection path has not been declared congested and the flow control mode has not been enabled yet, then, in box 304, flow control mode is enabled (flag FCTL is set to 1), the connection path is considered as becoming congested, and received packets are no longer acknowledged by the X.25 Access Agent. Finally, the current received packet is transmitted (box 307) over the network. Then the process returns to box 300 and a new incoming packet is awaited.

Referring to box 302, if the current number of available green tokens (NB_TOKEN) is greater than or equal to S1, decision box 305 is entered to determine if the number of available green tokens NB_TOKEN exceeds second threshold S2 (e.g. 75% of MGT) and if FCTL value is 1, i.e. flow control mode is enabled yet. If the result of the test is no, that is, either FCTL is set to zero or NB_TOKEN is less than S2, no particular action is taken, and current packet is transmitted over the network as illustrated by entering box 307. Conversely, if the result of the test (box 305) is yes, i.e. flow control mode is enabled (FCTL =1) and the number of green tokens (NB_TOKEN) exceeds second threshold S2, then box 306 is entered for disabling flow control mode (FCTL =0), i.e. received packets are acknowledged again by X.25 Access Agent (FIG.2, 203) to emitting attached X.25 equipment. Then box 307 is entered to transmit the current packet. Finally, the system recycles to wait for a new incoming packet in Leaky Bucket component (box 300). The marking (red or green) of the packets by the leaky bucket mechanism intervenes after the X.25 flow control mechanism has functioned.

The X.25 flow control procedure described in connection with FIG. 3 can be summarized as follows. Each time a packet sent from the X.25 emitting device reaches the access node's Leaky Bucket component, after having passed successively through X.25 Access Agent and X.25 Network Interface, the count of available green tokens in the green token pool is determined. If the number of green tokens is less than S1, a signal is sent from the Leaky Bucket component to the X.25 Access Agent in order to stop acknowledgments of received packets to the X.25 emitting device. When the emitting X.25 data equipment terminal does not received any more acknowledgments for packets already received, it stops sending packets after completion of transmitting the current window. Then, it waits for receipt of acknowledgments again to re-start packet transmissions. In the meanwhile, packets already received, which were queued in the Network component, are passed to the Leaky Bucket component. Because no more packets arrive at the X.25 Access Agent, the number of available green tokens in the green token pool increases as a function of the green token generation rate. When the X.25 control flow mechanism detects that the number of green tokens exceeds S2, a second signal is sent to the X.25 Access Agent for resuming acknowledgments of received packets. Consequently, the X.25 terminal equipment resumes packet transmissions.

From the above-described procedure it can be seen that the X.25 flow control mechanism of the present invention operates in a preventive way, since it relies on the count of green tokens and not on the detection of red tokens which would indicate that congestion already underway. Indeed, by inducing the X.25 attached equipment to stop transmitting packets if the number of available green tokens reaches a low threshold (S1), it allows restoration of the number of green tokens in the green token pool and prevents packets from being marked red and potentially being discarded. Without the presence of the X25 flow control mechanism of the invention, the discarding of red packets, in congestion situations, would lead to repeating of discarded data and more precisely, of entire windows containing discarded packets, which in turn would increase the congestion of the network. Furthermore, by using an upper second threshold (S2) to re-initiate regular transmission of packets, the enabling of the flow control procedure relies on an hysteresis cycle that would prevent the system from getting into oscillation.

While two thresholds are used in the preferred embodiment of the invention, a single threshold (e.g. 50% of MGT) could have been used instead, but to the prejudice of the overall efficiency, since, as previously said, the hysteresis cycle provided by the two thresholds prevents the system from getting into oscillation.

In brief, as above-described, the present invention provides a preventive X.25 flow control mechanism for use in a high speed packet switching network where X.25 calls are multiplexed on network trunks, each connection using a reserved amount of the total bandwidth available according to the Quality of Service contracted at call setup X.25 data terminal equipments access the network via access nodes. Each access node includes a Leaky Bucket component for controlling congestion, where packets within the agreed-to characteristics are marked as high priority ("green" packets), while packets exceeding the pre-specified characteristics are marked with a low priority ("red" packets). Each time an incoming packet is received by the leaky bucket component, the invention takes advantage of the existing leaky bucket mechanism, by comparing the number of green tokens available in the green token pool to two predetermined threshold values. If the number of green tokens is less than the low threshold, acknowledgments of received packets are stopped to induce an interruption of packet transmission by the emitting attached X.25 terminals and (consequently) a restoration of the number of available green tokens in the green token pool. Conversely, if the number of green tokens reaches the high threshold, packet acknowledgments are restored and packet transmission resumes. The flow control method of the present invention prevents network congestion by testing the green token pool and avoiding "red" marking which would lead to packet discards.

While the invention has been described in terms of preferred embodiments, those skilled in the art will recognize that the invention can be practiced with variations and modifications. Therefore, it is intended that the appended claims shall be construed to include both preferred embodiments and all variations and modifications thereof that fall within the true spirit and scope of the invention.

Having thus described our invention, what we claim as new and desire to secure by Letters Patent is as follows:

1. A method for controlling data traffic at an access node of a packet switching network, said data traffic being provided from sources which continue to transmit traffic only where acknowledgments of previously-transmitted traffic are received on a predetermined basis, said access node implementing a leaky bucket admission control mechanism in which tokens are added to the pool at a predetermined rate, said method comprising the steps of:

receiving and temporarily storing each incoming packet;

testing the number of tokens available in the token pool against first and second thresholds having values greater than zero;

discontinuing acknowledgements of received packets where the test reveals the number of available tokens is less than the first threshold and packet acknowledgments are currently being provided to the packet source;

resuming acknowledgments of received packets where the number of available tokens is greater than a second threshold and acknowledgments are currently not being provided to the packet source; and transmitting the stored packet and decrementing the token pool.

2. A computer readable memory device, comprising:

said computer readable memory device containing computer instructions and data to execute in a computer for practice of the method of claim 1.

3. Electromagnetic signals propagating over a computer network, comprising:

said electromagnetic signals having computer instructions and data to execute in a node for practice of the method of claim 1.

4. The method of claim 1 further comprising:

setting the second threshold greater than the first threshold.

5. The method of claim 1 further comprising:

setting the first threshold to a value less than 50% of the maximum number of tokens in the token pool; and, setting the second threshold to a value greater then 50% of the maximum number of tokens in the token pool.

6. The method of claim 1 further comprising:

setting the first threshold to a value of 25% of the maximum number of tokens in the token pool; and, setting the second threshold to a value of 75% of the maximum number of tokens in the token pool.

7. A node to execute computer instructions for carrying out the method according to claim 1.

8. A communications network comprising at least one node to execute computer instructions according to claim 1.

9. A system for controlling data traffic at an access node of a packet switching network, said data traffic being provided from sources which continue to transmit traffic only where acknowledgments of previously-transmitted traffic are received on a predetermined basis, said access node implementing a leaky bucket admission control mechanism in which tokens are added to the pool at a predetermined rate, said system comprising:

a packet buffer for receiving and temporarily storing each incoming packet;

a comparator for testing the number of tokens available in the token pool against first and second thresholds having values greater than zero;

acknowledgment controlling logic to discontinue generating packet acknowledgments when the test reveals the number of available tokens is less than the first threshold and the packet acknowledgments are being provided to the packet source, and for resuming generation of such acknowledgments when the number of available tokens is greater than a second threshold and acknowledgments are not being provided to the packet source;

a network interface to transmit the packet stored in the buffer; and token pool logic responsive to transmission of the packet for decrementing the token pool.

10. The system of claim 9 further comprising:

the second threshold is set to a value greater than the first threshold.

11. The system of claim 9 further comprising:

the first threshold is set to a value less than 50% of the maximum number of tokens in the token pool; and, the second threshold is set to a value greater then 50% of the maximum number of tokens in the token pool.

12. The system of claim 9 further comprising:

the first threshold is set to a value of 25% of the maximum number of tokens in the token pool; and, the second threshold is set to a value of 75% of the maximum number of tokens in the token pool.

13. A system for controlling data traffic at an access node of a packet switching network, said data traffic being provided from sources which continue to transmit traffic only where acknowledgments of previously-transmitted traffic are received, said access node implementing a leaky bucket admission control mechanism in which tokens are added to the pool at a predetermined rate, said system comprising:

a packet buffer to receive and temporarily store each incoming packet;

means for testing the number of tokens available in the token pool against first and second thresholds;

means for discontinuing acknowledgements of received packets where the test reveals the number of available tokens is less than the first threshold and packet acknowledgments are currently being provided to the packet source;

means for resuming acknowledgments of received packets where the number of available tokens is greater than a second threshold and acknowledgments are currently not being provided to the packet source; and means for transmitting the stored packet and decrementing the token pool.

14. The system of claim 13 further comprising:

means for setting the second threshold greater than the first threshold.

15. The system of claim 13 further comprising:

means for setting the first threshold to a value less than 50% of the maximum number of tokens in the token pool; and, means for setting the second threshold to a value greater then 50% of the maximum number of tokens in the token pool.

16. The system of claim 13 further comprising:

means for setting the first threshold to a value of 25% of the maximum number of tokens in the token pool; and, means for setting the second threshold to a value of 75% of the maximum number of tokens in the token pool.

* * * * *